Nov. 26, 1957
W. L. HOWLAND
2,814,198
PRESSURE MEASURING SYSTEMS
Filed Feb. 16, 1954
2 Sheets-Sheet 1
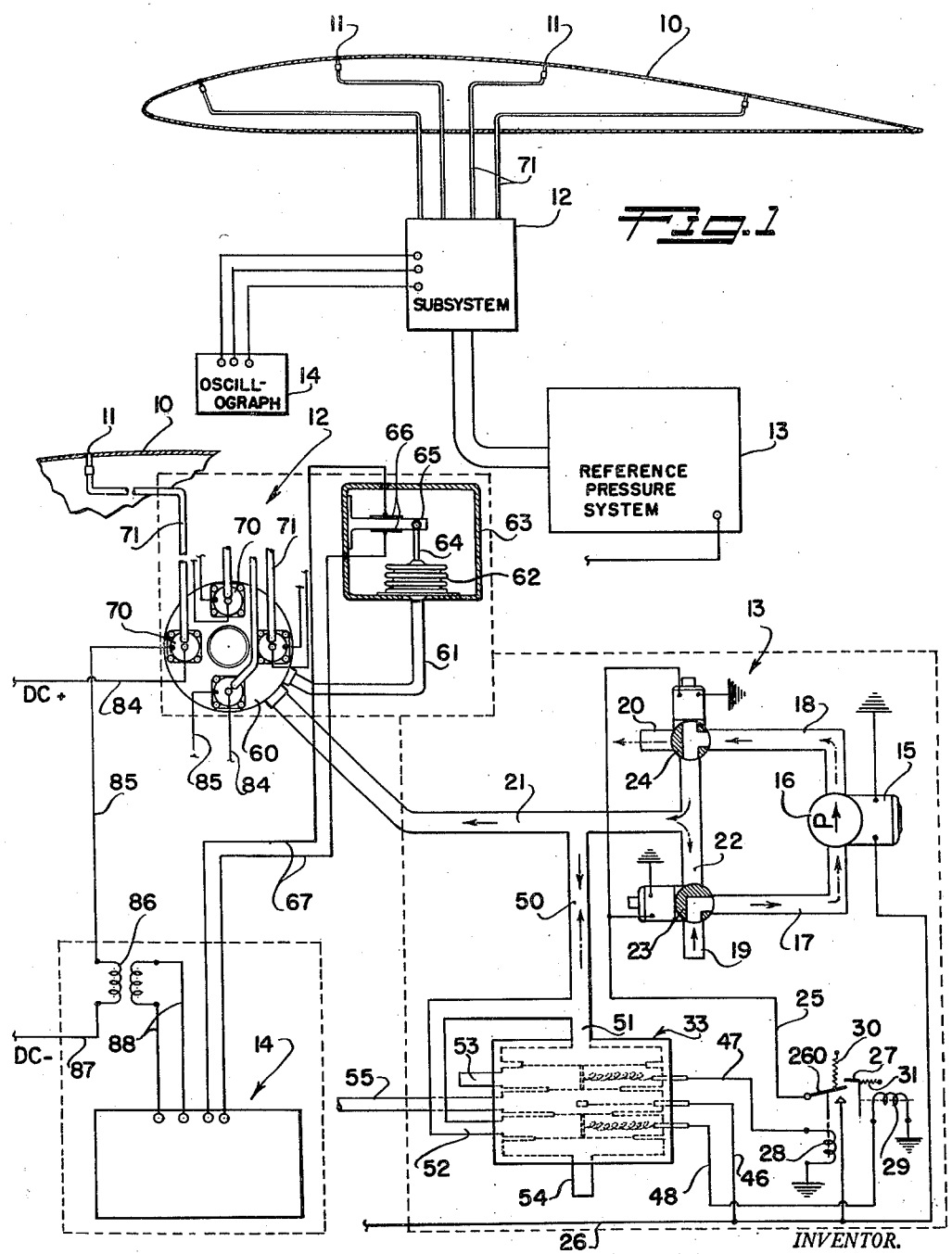
INVENTOR.
WALTER L. HOWLAND
BY
George C. Sullivan
Agent Nov. 26, 1957 W. L. HOWLAND 2,814,198
PRESSURE MEASURING SYSTEMS
Filed Feb. 16, 1954 2 Sheets-Sheet 2
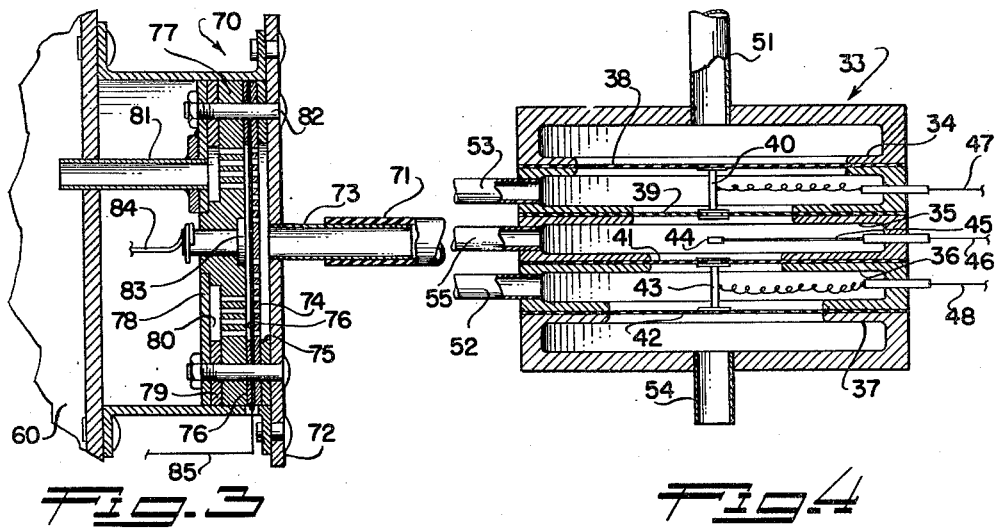
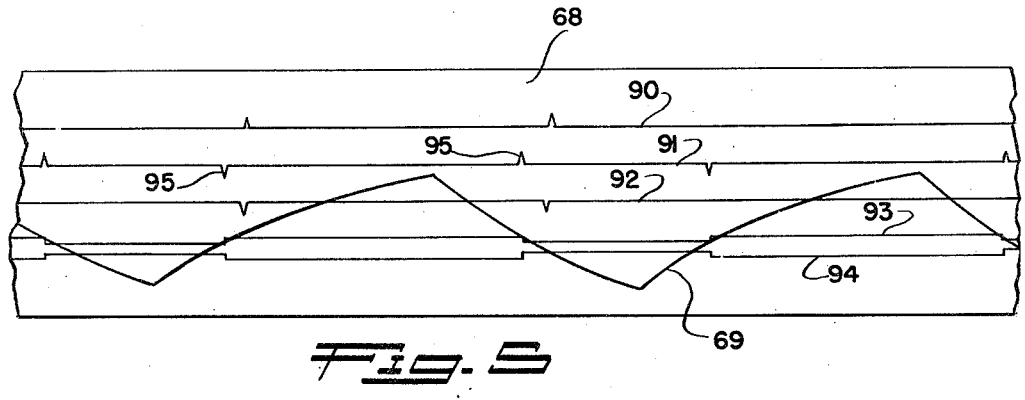
INVENTOR.
WALTER L. HOWLAND
BY
*George C. Sullivan*
Agent

United States Patent Office 2,814,198
Patented Nov. 26, 1957

2,814,198

PRESSURE MEASURING SYSTEMS

Walter L. Howland, Pasadena, Calif., assignor to Lockheed Aircraft Corporation, Burbank, Calif.

Application February 16, 1954, Serial No. 410,541

9 Claims. (Cl. 73—147)

This invention relates to the measuring of pressures, and relates more to systems for measuring and/or recording pressures from a multiplicity of fluid pressure sources or regions.

In aircraft flight testing and in many other types of experimental work, it is often necessary to obtain measurements of large numbers of fluid pressures. One of the most commonly used devices for this purpose is the manometer. Due to the various attitudes assumed by the airplane in a test flight, it is difficult to employ a manometer and its use creates numerous problems such as the blowing over of the fluid and the filling of the lines. Furthermore, it is difficult to measure pressure from a multiplicity of sources or regions by means of a manometer unless the installation is made very bulky and cumbersome. Another system that has been employed for the purpose requires the use of a large number of pressure transducers. This last named system has several disadvantages such as the necessity of changing the calibration and zero points of the many transducers, voltage supply problems and the difficulty of maintaining stability of the numerous transducers coupled with the considerable cost, size and weight of the installation.

An object of the present invention is to provide a practical and effective pressure measuring system which avoids the disadvantages and shortcomings of the previously employed systems.

Another object of the invention is to provide a pressure measuring and/or recording system of the character that is operable to measure the pressures at a multitude of pressure points or regions and yet requires the employment of but one pressure transducer. This feature materially reduces the cost, weight and complexity of the system and avoids the necessity of calibrating a plurality of transducers, maintaining the stability of such units, etc.

Another object of the invention is to provide a system of the character described that is substantially unaffected by the attitudes assumed by the airplane and avoids the various difficulties encountered in employing the manometer pressure measuring systems.

A further object of the invention is to provide a system of this kind mentioned that is readily adapted for the measuring and/or recording of pressures, as may be found or used in the various arts and industries.

A still further object of my invention is to provide a system of the class described employing null pressure cells or diaphragm units each exposed at one side to a respective unknown pressure or pressures to be measured and capable when actuated of making or breaking an electrical circuit and a novel means for imposing a reference pressure on the other sides of the several cells or units in a known cycled or programmed manner whereby measurements of the unknown pressures may be superimposed upon an oscillographic recording of the cycling programmed referenced pressure to provide readings or measurements of the several unknown pressures. This manner of obtaining readings or records of the plurality of unknown pressures greatly reduces the weight and cost of the required equipment, shortens the time expended in obtaining the pressure data and materially lessens the oscillographic record space needed to record the data and also shortens the data reduction time. In my system all channels of the oscillographs carry two or more measurements instead of only one, as in prior systems, and only about 10% of the calibrations need be employed, thus reducing the time required to instrument the airplane or other device and further greatly shortening the data reduction time.

Other objectives and features of the invention will become apparent from the following detailed description of a typical preferred embodiment throughout which reference will be made to the accompanying drawings, wherein:

Figure 1 is a schematic or diagrammatic view of the system as employed in connection with the measuring of pressures on an airfoil;

Figure 2 is a diagrammatic view of the system illustrating certain of the electrical circuits and the flow paths of the referenced pressure;

Figure 3 is a greatly enlarged longitudinal sectional view of one of the null pressure diaphragm units or pressure switches;

Figure 4 is a longitudinal sectional view of the reference pressure system pressure limiting device; and Figure 5 is a fragmentary view of an oscillographic record as obtained by the system of the invention illustrating the trace or record of the reference pressure and the pips or measurements of the unknown pressures.

The system of the invention is adapted for use in practically any situation where it is desired or necessary to measure fluid pressures. Accordingly, although the system is shown in the drawings and described below as employed to measure the pressures at various regions on an airfoil, it is to be understood that this is merely one embodiment and application and the invention is not to be construed as limited either in construction or use to this particular field or application. In Figure 1 there is shown an airfoil 10 having pressure receiving taps 11 spaced along its surface at the regions where it is desired to determine the pressures. It will be apparent there may be any number of pressure receiving taps 11 and the test program may be such that a number of similar pressure receiving taps are required on additional surfaces or regions remote from the airfoil 10. In the latter case the system will measure and record the pressures in the pluralities of separate or remote zones. Figure 1 shows a form of system including a single sub-system 12 for the several taps 11 of the airfoil 10, it being understood that where pressures at several regions or zones are to be measured the system will include a plurality of such sub-systems 12.

The system of the invention, as illustrated, may be said to include generally a reference pressure means 13 operable to provide a programmed or cycling fluid pressure, the sub-system 12 receiving the cycled pressure from the means 13 and responsive to the cycled pressure and to the pressures received at the taps 11 to produce cycled pressure signals and tap pressure signals, and a recording oscillograph 14 receiving said signals to record the same.

The reference pressure means 13 includes a suitable pump 16 driven by an electric motor 15, or the equivalent. It is preferred to employ air under pressure as the reference pressure medium and the pump 16 is preferably of the dry-air type. An inlet pipe 17 extends to the low pressure or inlet side of the pump 16 and an outlet pipe 18 extends from the pressure side of the pump. The inlet pipe 17 has an open air receiving branch 19 and the outlet pipe 18 has a pressure exhausting branch 20. A duct or pipe 21, which extends to the sub-system unit 12, has branches 22 leading to the two pump lines 17 and 18. A three-way solenoid valve 23 is operable between the position illustrated in Figure 2 where it connects the air receiving branch 19 with the pump line 17 while closing off communication between the pipe 17 and the branch 22 and a position where it places the pump inlet line 17 in communication with the pipe branch 22. A similar three-way solenoid valve 24 is operable between the position illustrated in Figure 2 where it places the pump outlet pipe 18 in communication with the pipe branch 22 while closing off the discharge branch 20 and a position where it places the pump outlet pipe 18 in communication with the discharge branch 20 while closing off communication between the pipe 18 and the branch 22.

The reference pressure means 13 further includes an energizing circuit 25 for the solenoid valves 23 and 24. The circuit 25 extends from a power buss 26 to the valves 23 and 24, the valves being grounded and of the type that is electrically actuated in one direction and spring actuated in the other direction. A latching relay controls the circuit 25 and includes a contactor 260, a latch 27, and two coils or solenoid windings 28 and 29. In the particular latching relay illustrated the winding 28 is operable when energized to close the contactor 260 to complete the circuit 25 while the winding 29 is operable to release the latch 27, there being a spring 30 urging the contactor 260 to the open position and a spring 31 urging the latch 27 to the latched position, it being apparent that other appropriate types of relays may be employed if found desirable.

The reference pressure means 13 further includes a multiple pressure switch device or pressure limiter for controlling the windings 28 and 29 in a manner to cause cycling of the pressure in the duct or pipe 21 between a pressure exceeding the highest pressure being measured at the taps 11 and a pressure lower than any of such sensed or measured pressures. This multiple pressure actuated switch device includes a housing 33, best illustrated in Figure 4, having four spaced and generally parallel internal apertured partitions 34, 35, 36 and 37. While the housing 33 may be of any appropriate construction, I have shown it made up of a plurality of superimposed complementary rectangular or annular sections, designed to together constitute a hollow case or shell having the four spaced parallel internal partitions 34 to 37 inclusive. The partition 34 carries a flexible diaphragm 38 and the adjacent partition 35 has a flexible diaphragm 39. The diaphragm 38 has a considerably larger exposed or active area than the diaphragm 39 and the two diaphragms 38 and 39 are connected by a central rod 40 to move in unison. The partition 36 carries a flexible diaphragm 41 presenting an active or exposed area considerably smaller in effective diameter than the companion diaphragm 42 carried by the adjacent partition 37. The diaphragms 41 and 42 are connected to move in unison by a central rod 43. A relatively stationary contact 44 is supported in the chamber or space between the diaphragms 39 and 41 by a flexible conductive arm 45 which has a sealed terminal connecting it with a wire 46. The wire 46 leads to the power bus 26. The rod 40, which connects the companion diaphragms 38 and 39 is of conductive material and has a contact or end at the diaphragm 39 engageable with the power contact 44. A lead or conductor 47 extends from one terminal of the above mentioned winding 28 to the rod 40 and has a flexible portion adjacent the rod so as to permit free movement of the diaphragms 38 and 39. The other terminal of the relay winding 28 may be grounded. The rod 43, for connecting the companion diaphragms 41 and 42 is also of conductive material and has a contact or end engageable with the power contact 44. A lead 48 extends from this rod 43 to one terminal of the relay winding 29 and the other terminal of this winding may be grounded. The lead 48 has a flexible portion at the rod 43 to allow free movement of the diaphragms 41 and 42.

The pressure controlling multiple switch device is operated by or responsive to three different air pressures, namely; the pressure in the pipe 21 leading from the pump system, a low pressure, for example room pressure or ambient pressure, and a medium reference pressure, for example total head pressure. A pipe or tube 50 leads from the duct 21 and has two branches 51 and 52. The branch 51 communicates with the interior of the multiple pressure switch device 33 above the large diaphragm 38 while the branch 52 communicates with the space between the diaphragms 41 and 42 whereby both of these areas or spaces are in communication with the duct 21. A port or pipe 53 supplies ambient pressure to the space between the companion diaphragms 38 and 39 and a similar pipe 54 also supplies ambient pressure to the space below the diaphragm 42. A tube 55 supplies total head pressure, or the equivalent, to the chamber or space between the diaphragms 39 and 41.

It is believed the invention will be best understood by an explanation of the operation of the reference pressure means 13 before proceeding with the description of the sub-system 12. Assuming that the pump 16 is in operation and that the valves 23 and 24 are in the positions illustrated in Figure 2, air will circulate through the pipes 17, 18 and 22, as indicated by the full line arrows in Figure 2, and pressure will increase or build up in the duct 21. At this time the contactor 260 is open and the lower diaphragm rod 43 is in engagement with the power contact 44 while the upper contactor rod 40 is out of engagement with the contact 44. As a consequence the winding 29 is energized to hold the relay latch 27 released and the relay winding 28 is deenergized so that that contractor 260 is in the open position. Under this circumstance the air pressure in pipes 21, 50 and 52, in the space between the diaphragms 41 and 42, and in the space above the diaphragm 38, builds up or increases. When the air pressure reaches a given or predetermined maximum value the pressure acting on the large diaphragm 42 and opposed by the relatively low ambient pressure on the opposite side of the diaphragm 42 produces a net force greater than the net force of the same pressure acting on the smaller diaphragm 41 and opposed by the head pressure admitted at the pipe 55. As a consequence the diaphragms 41 and 42 are flexed to move the contactor rod 43 out of engagement with the power contact 44 and the relay 29 is de-energized. At the same time the increasing pressure from the pump line 21 acting on the upper or outer side of the large diaphragm 38 and opposed by the ambient pressure on the other side of the same diaphragm produces a net force greater than the net force resulting from the head pressure acting on the inner side of the smaller diaphragm 39 which latter pressure is opposed by the ambient pressure on the other side of the diaphragm 39 and flexes the diaphragms 38 and 39 to move the end of the rod 40 into engagement with the power contact 44. This completes the energizing circuit to the relay winding 28. The de-energization of the winding 29 and energization of the winding 28 causes operation or reversal of the solenoid valves 23 and 24, the closed contactor 260 completing the energizing circuit to the solenoid valves.

Reversal of the valves 23 and 24 from the positions illustrated in Figure 2 results in air flow through the pipes 17, 18, 21 and 22 in the directions indicated by the broken line arrows in Figure 2 to reduce the air pressure in the pipe 21 and all apparatus communicating therewith. When the air pressure in the line 21 and the multiple pressure switch device 33 reaches a given or predetermined low value the head pressure admitted by the pipe 55 and acting on the under side of the diaphragm 39 and opposed by the lower ambient pressure on the other side of the same diaphragm produces a net force greater than the net force produced by the lessened air pressure acting on the outer side of the larger diaphragm 38 and opposed by the ambient pressure on the other side of the diaphragm 38. As a consequence of this the diaphragms 38 and 39 are flexed to move the contactor rod 40 out of engagement with the contact 44 to open the energizing circuit of the relay winding 28. At the same time the ambient pressure admitted by pipe 54 and acting on the lower side of the diaphragm 42 and opposed by the lessened pressure on the other side of the same diaphragm 42 produces a net force greater than the net force produced by the head pressure acting on the upper side of the smaller diaphragm 41, which latter is opposed by the lessened pressure on the other side of the diaphragm. The larger net force moves or flexes the diaphragms 41 and 42 to move the rod 43 into engagement with the contact 44 to complete the energizing circuit to the relay winding 29 for actuating the latch 27. This de-energizing of the winding 28 and energization of the winding 29 opens the circuit to the solenoid valves 23 and 24 and the same are reversed to the positions illustrated in Figure 2 so that the air again circulates through the pipes 17, 18, 21 and 22 in the manner indicated by the full line arrows in Figure 2 and pressure again increases in the pipe 21 and all apparatus communicating therewith.

From the foregoing description of operation of the reference pressure means 13, it will be seen that so long as the pump 16 is in operation the air pressure in pipe 21 is continuously cycled between a given high pressure value and a given low pressure value. The apparatus is constructed and adjusted so that the high pressure value, that is the highest pressure attained by the air in the pipe 21 is at least slightly greater than the highest anticipated pressure to be measured at any of the taps 11 and the low pressure value, that is the lowest pressure reached by the air in pipe 21 is at least slightly lower than any of the anticipated pressures to be measured at the taps 11.

The above mentioned sub-system 12 receives and is responsive to the cycled air pressure from the referenced pressure system 13 and the pressures received at the taps 11 to provide signals which, in turn, are impressed on the measuring and/or recording device or oscillograph 14. The sub-system 12 includes a manifold or header 60 having its interior in communication with the pipe or duct 21 to receive the cycled reference air pressure from the system 13. The header 60 is preferably located adjacent or as near as convenient to the airfoil 10 or the general region of the pressure receiving taps 11. The system 12 furthers includes a pipe or tube 61 having one end in communication with the header 60 and having its other end in communication with the interior of a bellows 62. The bellows 62 constitutes a component of a transducer responsive to the cycling reference pressure in the pipe 21 and header 60 to provide representative electrical signals to be impressed on the oscillograph 14. The bellows 62, which is operated by the cycling reference air pressure, may be contained in a hollow case 63 and actuates a rod 64. The rod 64 is, in turn, pivotally or otherwise operatively connected with a beam 65. The beam 65 carries electrical strain gages 66 connected in circuits 67 extending to the oscillograph 14. The strain gages 66 may be of the well-known resistance wire type and upon flexure of the beam 65, by the action of the bellows 62, operate to vary the circuit 67 to impress signals on the oscillograph 14. Referring now to Figure 5, which illustrates a tape or record 68 as produced by the oscillograph 14 in a typical operation of the system it will be seen that the transient or cycling reference pressure from the means 13 is recorded as the curve or line 69. It should be observed that the system of the invention, or at least each sub-system 12 thereof, requires only one transducer.

The sub-system 12 further includes simple, light-weight and inexpensive pressure switches 70, each having one side acted upon by the transient or cycling reference pressure from the means 13 and its other side acted upon by a pressure being measured, that is the pressure from one of the taps 11. There is a pressure switch 70 for each pressure to be measured and, if desired, the switches 70 may be buried in the airfoil 10 or other structure to be immediately adjacent their respective taps 11 with tubes or lines running from the switches to the header 60. However in the application of the invention illustrated the pressure switches 70 are arranged at the header 60 and tubes or lines 71 extend from the switches to their respective pressure receiving taps 11. With this arrangement the lines 71 need not be of equal length but may be of different lengths as the conditions of installation require. Figure 3 illustrates one of the pressure switches 70 which will now be described, it being understood that the following description is applicable to the other switches 70.

Each pressure switch 70 includes a base plate 72 mounted on the header 60 and having a tube or nipple 73 connected with one of the lines 71 extending to a tap 11. A perforated disc 74 of brass, or the like, is mounted on the plate 72 by a gasket 75 of fish-paper or the like. A thin but imperforate limp diaphragm 76 of electrically conductive material is arranged at the other side of the perforated disc 74. In practice, the diaphragm 75 may be formed of platinum, about 0.0005" thick. A gasket 76 of fish-paper, or the like, is provided on the peripheral portion of the diaphragm 75 and a perforated plate or disc 77 is engaged on the gasket. An inner disc or plate 78 is, in turn, mounted on the perforated disc 77 by a gasket 79 so as to leave an annular chamber 80 at the face of the perforated disc. A tube 81 is secured to the plate 78 so as to have one end communicate with the chamber 80 and its other end communicating with the interior of the header 60. The several stacked or superimposed parts of the pressure switch 70 are secured together by bolts or screws 82 passing through openings in their peripheral regions. The perforated discs 74 and 77 support the diaphragm 75 in such a manner as to prevent damage to the thin diaphragm by excessively high or excessively low pressures, the arrangement being such that the pressure switch is extremely sensitive and yet is not impaired by such excessive pressures.

The pressure switch 70 further includes a contact 83 of platinum, or the like, secured in the disc 77 to have its active face exposed at the inner surface of the disc. The disc 77 is constructed of Bakelite, or other suitable non-conductive material. A line or wire 84 extends from one side of an appropriate D. C. power source and is connected with the outer end of the contact 83. A wire 85 is connected with the periphery of the conductive diaphragm 76 and extends to one terminal of the primary of a transformer 86, there being a line 87 extending from the other terminal of the primary to the other side of said power source. The transformer 86 is preferably of the miniature type and leads 88 extend from its secondary to the oscillograph 14. There is a transformer 86 for each switch 70, the transformers being connected between the switches 70 and the oscillograph 14 by the lines 85 and 88.

In the operation of the pressure measuring and recording system the pump 16 is continuously operated and the multiple pressure switch device 33 controls the circuits 47 and 48 of the relay windings 28 and 29 to cause the reference pressure means 13 to produce the continuously cycling reference pressure in the pipe 21 and header 60, as already described. This cycling reference pressure acts on the inner sides of the limp diaphragms 76 of the several pressure switches 70 communicating with the header 60 and the cycling reference pressure also actuates the transducer bellows 62 to cause the record or curve 69 to be produced on the oscillographic record 68, as already described. The cycling time of the reference pressure may vary between a fraction of a second and several seconds, depending upon the conditions of use of the system, for example upon the air speed and altitude of the airplane. Twice during each complete cycle of the reference pressure means 13 the diaphragm 76 of each pressure switch 70 experiences an equilibrium of pressures. During that portion of the cycle in which a given unknown pressure being measured exceeds the reference pressure in the respective switch 70, the switch diaphragm 76 is held against the contact 83 by the pressure from the tap 71 and current flows through the wire 85 to the respective transformer 86. It is the condition of equilibrium pressure in the pressure switches 70 that is significant and the signals from the switches 70 are fed through the respective transformers 86 to superimpose pips on the oscillograph channels. To read the pressure at a given switch 70 and tap 11, the pressure of the cycling reference pressure is read at the instant the pip occurs. Thus, referring to Figure 5, a channel of the oscillograph 14 produces the curve 69 representing the reference pressure and other channels produce the lines 90, 91, 92, 93 and 94, each representing pressures at one or more pressure switches 70 and the pips 95 representing the equilibrium pressure signals from the switches 70 appear on these channel lines. By reading the pressures represented by the reference pressure line 69 opposite or aligned with the pips 95 of the respective channel lines 90 to 94 inclusive, the pressures in the switches 70 and, therefore, at the taps 11, can be readily determined. In practice or if desired, signals from one or more pressure switches 70 may be superimposed on the reference pressure channel of the oscillograph to produce signal pips 95 on the line 69. In fact, the several channels of the oscillograph 14 may each carry two or more pressure measurements by feeding signals from two or more switches 70 thereto.

The pressure switches 70 are small, light-weight, inexpensive devices and yet are capable of withstanding heavier overloads than the conventional more expensive and heavier transducers of equivalent sensitivity. If desired, the pressure switches 70 may be expendable, that is they may be arranged at or adjacent the points of pressure measurement and buried or mounted in such a way as to remain at these points when the tests or measurements are completed and the other apparatus is removed.

Having described only a typical form of the invention I do not wish to be limited to the specific details set forth herein but wish to reserve to myself any variations or modifications that may appear to those skilled in the art and fall within the scope of the following claims.

I claim:

1. In a system for measuring a plurality of fluid pressures; a line for carrying each pressure, an oscillograph, a pressure switch for each line including a chamber, a limp conductive diaphragm extending across the chamber, a power contact at one side of the chamber, means for supplying a cycling fluid pressure to said side of the chamber, the other side of the chamber being in communication with the respective pressure line, a circuit from the diaphragm to the oscillograph to impress signals on the same when the diaphragm moves into and out of engagement with the contact as a result of the cycling pressure a transducer operated by the cycling pressure, and a circuit from the transducer to the oscillograph to impress a signal on the same to produce a record of the cyling pressure which forms a reference for the reading of the signals obtained by the actions of said switches.

2. In a system for measuring a plurality of fluid pressures; a line for carrying each pressure, an oscillograph, a pressure switch for each line including a chamber, a limp conductive metal-foil diaphragm extending across the chamber, a power contact at one side of the chamber, means for supplying a cycling fluid pressure to said side of the chamber, the other side of the chamber being in communication with the respective pressure line, a circuit from the diaphragm to the oscillograph to impress signals on the same when the diaphragm moves into and out of engagement with the contact as a result of the cycling pressure a transducer operated by the cycling pressure, and a circuit from the transducer to the oscillograph to impress a signal on the same to produce a record of the cycling pressure which forms a reference for the reading of the signals obtained by the actions of said switches.

3. In a system for measuring pluralities of fluid pressures; a reference pressure system for supplying a constantly cycling fluid pressure, an oscillograph, lines carrying the pressures to be measured, and at least one subsystem including pressure switches on certain of said lines each including a cell, a limp conductive diaphragm electrically connected with the oscillograph and extending across the cell, a power contact at one side of the diaphragm engageable thereby, means for conducting the constantly cycling reference pressure to said side of the diaphragm, the cell placing the other side of the diaphragm in communication with its respective line and the cycling reference pressure and the pressure from said line moving the diaphragm into and out of engagement with the contact a transducer operated by the cycling pressure, and a circuit from the transducer to the oscillograph to impress a signal on the same to produce a record of the cycling pressure which forms a reference for the reading of the signals obtained by the actions of said switches.

4. In a system for measuring pluralities of fluid pressures; a reference pressure system for supplying a constantly cycling fluid pressure, an oscillograph, lines carrying the pressures to be measured, and at least one sub-system including pressure switches on certain of said lines each including a cell, a limp conductive metal-foil diaphragm electrically connected with the oscillograph and extending across the cell, a power contact at one side of the diaphragm engageable thereby, means for conducting the reference pressure to said side of the diaphragm, the cell placing the other side of the diaphragm in communication with its respective line and the cycling reference pressure whereby the pressure from said line moves the diaphragm into and out of engagement with the contact a transducer operated by the cycling pressure, and a circuit from the transducer to the oscillograph to impress a signal on the same to produce a record of the cycling pressure which forms a reference for the reading of the signals obtained by the actions of said switches.

5. In a system for measuring pluralities of fluid pressures; a reference pressure system for supplying a constantly cycling fluid pressure, an oscillograph, lines carrying the pressures to be measured, and at least one subsystem including transducer means responsive to the cycling pressure to impress a reference signal on the oscillograph, pressure switches on certain of said lines each including a cell, a limp conductive diaphragm electrically connected with the oscillograph and extending across the cell, a power contact at one side of the diaphragm engageable thereby, means for conducting the reference pressure to said side of the diaphragm, the cell placing the other side of the diaphragm in communication with its respective line and the cycling reference pressure and the pressure from said line moving the diaphragm into and out of engagement with the contact a transducer operated by the cycling pressure, and a circuit from the transducer to the oscillograph to impress a signal on the same to produce a record of the cycling pressure which forms a reference for the reading of the signals obtained by the actions of said switches.

6. In a system for measuring pluralities of fluid pressures; a reference pressure system for supplying a constantly cycling fluid pressure comprising a constantly operating pump having flow conduits extending thereto and therefrom, valve means controlling the conduits, and a multiple pressure switch means responsive to maximum and minimum pressure conditions in said conduits and controlling the valve means, an oscillograph, lines carrying the pressures to be measured, and at least one sub-system including pressure switches on certain of said lines each including a cell, a limp conductive diaphragm extending across the cell, a power contact at one side of the diaphragm engageable thereby, means for conducting the cycling reference pressure to said side of the diaphragm, the cell placing the other side of the diaphragm in communication with its respective line so that the differentials between the cycling reference pressure and the pressure from said line move the diaphragm into and out of engagement with the contact signal circuit means carrying signals from at least one of said switches to the oscillograph to cause the same to record the conditions of equilibrium of the cycling pressure and the pressures being measured, a transducer responsive to the cycling pressure, and circuit means impressing signals from the transducer on the oscillograph so that the latter records the cycling pressure concurrently with the recording of said conditions.

7. In a system for measuring pluralities of fluid pressures; a reference pressure system for supplying a constantly cycling fluid pressure comprising a constantly operating pump having a high pressure, low pressure and final outflow conduit system, valves associated with the conduit system for controlling flow therein, relay means controlling the valves, and a multiple pressure responsive switch device controlling the relay means in response to the maximum and minimum pressures in the final outflow region of the conduit system, an oscillograph, lines carrying the pressures to be measured, and at least one sub-system including pressure switches on certain of said lines each including a cell, a limp conductive diaphragm electrically connected with the oscillograph and extending across the cell, a power contact at one side of the diaphragm engageable thereby, means for conducting the reference pressure to said side of the diaphragm, the cell placing the other side of the diaphragm in communication with its respective line and the cycling reference pressure and the pressure from said line moving the diaphragm into and out of engagement with the contact.

8. In a system for measuring pluralities of fluid pressures; a reference pressure system for supplying a constantly cycling fluid pressure, an oscillograph, lines carrying the pressures to be measured, and at least one sub-system including a header receiving the cycling pressure from said reference pressure system, a pressure switch for each of certain of said lines, each switch including a cell having one end in communication with the header and its opposite end in communication with the related line, a power contact in one end portion of the cell, a diaphragm extending across the interior of the cell to be engageable with the contact and to have one side acted upon by the reference pressure and its other side acted upon by the pressure in said related line, a signal circuit from the diaphragm to the oscillograph to actuate the oscillograph to produce a record of the pressures in said certain lines, a transducer operated by the cycling pressure, and a signal circuit from the transducer to the oscillograph to actuate the transducer to produce a record of the cycling pressure concurrently with the record of the pressures being measured.

9. In a system for measuring pluralities of fluid pressures; a reference pressure system for supplying a constantly cycling fluid pressure, an oscillograph, lines carrying the pressures to be measured, and at least one sub-system including a header receiving the cycling pressure from said reference pressure system, a pressure switch for each of certain of said lines, each switch including a cell having one end in communication with the header and its opposite end in communication with the related line, a power contact in one end portion of the cell, a limp metal-foil diaphragm extending across the interior of the cell to be engageable with the contact and to have one side acted upon by the reference pressure and its other side acted upon by the pressure in said related line, a signal circuit from the diaphragm to the oscillograph a transducer operated by the cycling pressure, and a signal circuit from the transducer to the oscillograph so that the oscillograph produces a reference record of the cycling pressure to be read with the record produced by signals from the first named signal circuit.

References Cited in the file of this patent

UNITED STATES PATENTS

| | | |
|---|---|---|
| 2,423,340 | Pelleterre | July 1, 1947 |
| 2,551,526 | Campbell | May 1, 1951 |

OTHER REFERENCES

Society of Automotive Engineers Journal (Transactions), vol. 52, No. 11, pp. 548–555, November 1944.